(12) United States Patent
Auslander et al.

(10) Patent No.: US 8,750,593 B2
(45) Date of Patent: Jun. 10, 2014

(54) SUBSTITUTE CHECK INCORPORATING ENCODED INDICATION OF SECURITY FEATURE IN ORIGINAL CHECK

(75) Inventors: Judith D. Auslander, Westport, CT (US); Matthew J. Campagna, Ridgefield, CT (US); Robert A. Cordery, Danbury, CT (US); Cindy Mangiameli, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 2422 days.

(21) Appl. No.: 11/593,813

(22) Filed: Nov. 7, 2006

(65) Prior Publication Data

US 2008/0107326 A1     May 8, 2008

(51) Int. Cl.
*G06K 9/00*     (2006.01)

(52) U.S. Cl.
USPC .......................................... 382/137

(58) Field of Classification Search
USPC .............................. 383/135; 382/137; 705/42
See application file for complete search history.

(56) References Cited

U.S. PATENT DOCUMENTS

| | | | |
|---|---|---|---|
| 6,108,643 A * | 8/2000 | Sansone | 705/62 |
| 2003/0142376 A1 * | 7/2003 | Tabata et al. | 358/518 |
| 2004/0133516 A1 * | 7/2004 | Buchanan et al. | 705/42 |
| 2005/0129300 A1 * | 6/2005 | Sandison et al. | 382/137 |
| 2005/0281434 A1 * | 12/2005 | Handley et al. | 382/100 |
| 2006/0115110 A1 * | 6/2006 | Rodriguez et al. | 382/100 |
| 2007/0194103 A1 * | 8/2007 | Manheim | 235/379 |

* cited by examiner

*Primary Examiner* — Amara Abdi
(74) *Attorney, Agent, or Firm* — Steven J. Shapiro; Charles R. Malandra, Jr.

(57) ABSTRACT

A method includes scanning a check to generate image data representative of an image of the check. The method further includes detecting at least one security feature of the check. The method also includes transforming the image data to include at least one encoded indication of the detected at least one security feature of the check.

10 Claims, 6 Drawing Sheets

FIG. 7 wwwwwwwwwwwwwwwwwwww
ssssbbbssssbbbssssbbbssss
ssssbbbssssbbbssssbbbssss
wwwwwwwwwwwwwwwwwwww

FIG. 8A wwwwwwwwwwwwwwwwwwww
sssbbbbsssbbbbsssbbbbsssb
wwwwwwwwwwwwwwwwwwww

FIG. 8B wwwwwwwwwwwwwwwwwwww
sbbbbbbsbbbbbbsbbbbbbsbbb
wwwwwwwwwwwwwwwwwwww

FIG. 8C

SUBSTITUTE CHECK INCORPORATING ENCODED INDICATION OF SECURITY FEATURE IN ORIGINAL CHECK

BACKGROUND

This invention relates generally to banking system processes and more particularly to generation and processing of substitute checks in connection with the "Check21" check truncation system.

The federal Check Truncation Act enacted in 2003 (commonly referred to as "Check21") inaugurated sweeping changes in the handling of paper checks by the banking industry and its customers. According to traditional practices, a paper check passes from the drawer to the payee to the payee's bank, then through clearing channels to the drawee bank and thence after cancellation and payment back to the drawer. Check21, however, facilitates "truncation" of the paper check. That is, a party at or downstream from the payee may withhold the paper check from further handling, and may instead pass an electronic image data representation of the original check through the banking channels in lieu of the paper check. In some cases the electronic image data representation is used downstream in the banking channels to print a substitute paper check (sometimes referred to as an "IRD" or "image replacement document") for further processing. As to the original checks, these may be discarded after being held in storage for a certain period of time.

Efforts to prevent fraud in connection with checks have resulted in conventional practices in which one or more security features may be included in checks. Such features may include microprinting, printing with magnetic ink (e.g., MICR), holograms, etc. However, the check scanning processes currently proposed for check truncation typically fail to capture any security features incorporated in the original checks. Also any substitute paper check generated downstream in the process subsequent to check truncation may also lack any indication of security features in the original check. Consequently, the check truncation process may inhibit detection and/or investigation of fraudulent checks and/or verification of the legitimacy of original checks.

SUMMARY

According to an aspect of the invention, a method includes scanning a check to generate image data representative of an image of the check, detecting at least one security feature of the check, and transforming the image data to include at least one encoded indication of the at least one security feature that was (were) detected.

The method may further include using the transformed data to generate a printed replacement for the check. The printed replacement may include coded information that represents the at least one security feature that was (were) detected.

Using the transformed image data to generate the printed replacement may include using two different inks to print the printed replacement. The coded information may be represented by selecting some portions of the image for printing with one of the inks and selecting other portions of the image for printing with the other one of the inks. The two different inks may include a black fluorescent ink (BFI) and a black ink that is not fluorescent. Alternatively, the two different inks may include a magnetic ink and a nonmagnetic ink, and both of these inks may be black. As another alternative, the two inks may include two black inks that reflect substantially different spectra. (Such pairs of inks are sometimes referred to as being "metameric" relative to each other.)

The at least one security feature of the check may include at least one feature selected from among (a) a hologram; (b) an optically variable ink; (c) a magnetic ink; and (d) microprinting. The term "optically variable ink" refers to an ink having an appearance that depends on the illumination and/or viewing method. One example of an optically variable ink is a luminescent ink (fluorescent and/or phosphorescent). Another example is a metameric ink which appears visually under normal room light to be similar to other ink on the check, but is noticeably or measurably different under different illumination due to a different optical absorption spectrum. Yet another example is color-shifting ink as appears on new U.S. currency, where the color changes with the viewing angle.

According to another aspect of the invention, a method includes scanning a check to generate image data which represents a monochrome image of the check. The image data includes white data pixels and first color data pixels. The method further includes transforming the image data to convert selected ones of the first color data pixels to second color data pixels having a different value from the first color data pixels. Still further, the method includes using the transformed image data to drive a printer such that first printed pixels corresponding to unconverted ones of the first color data pixels are printed by the printer with a first black ink and second printed pixels corresponding to the second color data pixels are printed by the printer with a second black ink that has a characteristic that the first black ink lacks.

The characteristic of the second black ink that is lacked by the first black ink may be fluorescence, magnetism (i.e., the second ink may be magnetic ink), or reflectance of a different spectrum from the first ink.

According to yet another aspect of the invention, a method includes providing a data file which includes white data pixels having a first value, first color data pixels having a second value different from the first value, and second color data pixels having a third value different from the first and second values. The data file represents an image of the check. The method further includes printing a monochrome representation of the image using a first black ink for the pixels having the second value and a second black ink for the pixels having the third value. The second black ink is different from the first black ink.

The second ink may be BFI and the first ink may be non-fluorescent. Alternatively, the second ink may be magnetic and the first ink nonmagnetic. As another alternative, the two inks may be metameric relative to each other.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention, in its various aspects, provides a technique that allows a printed substitute check to include one or more coded representations of one or more security features that were present in the original check which the substitute check replaces. This technique calls for detecting the security feature(s) in the original check while scanning the original check as part of the truncation process. The resulting image data file includes a coded indication or indications of the security feature(s) of the original check. When the substitute check is later printed based on the image data file, two different black inks are used to print the substitute check. The two inks together create a substantially "true" image of the original check. However, one of the inks has a special characteristic such as fluorescence so that the indication(s) of the original check security feature(s) are represented in the substitute check in a manner that may be detected by a special scan of the substitute check. As a result, security features present in the original check may be allowed to survive the scan-print process in a detectable (though different) form and may thus continue to be useful for fraud detection and/or check authentication even in a printed substitute check.

Figure 1:
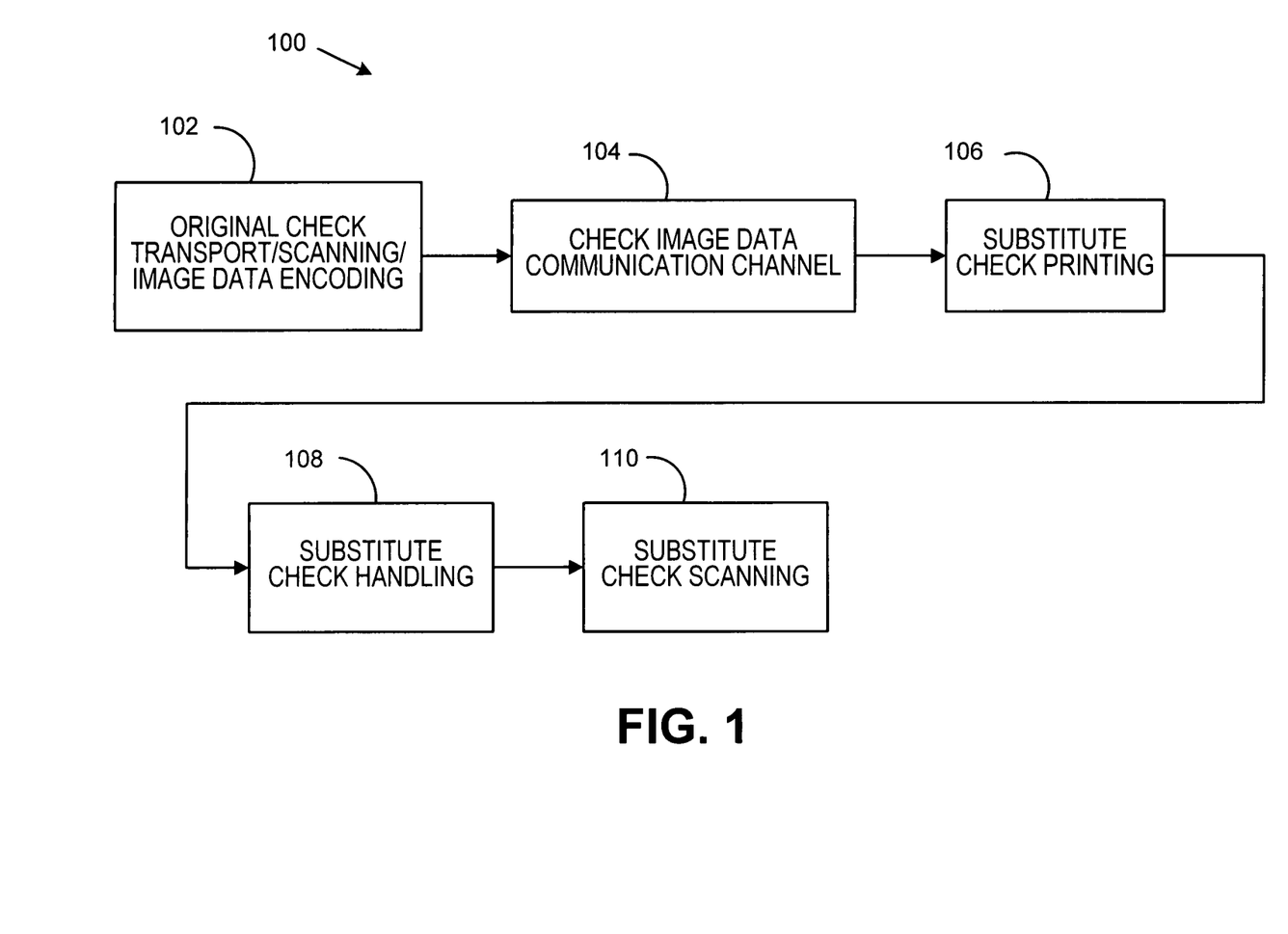
FIG. 1 is a schematic block diagram of a check truncation system provided in accordance with an embodiment of the invention.

FIG. 1 is a schematic block diagram of a check truncation system 100 provided in accordance with an embodiment of the invention. The check truncation system 100 includes a component 102 which is used to scan original checks as part of the check truncation process. As will be seen from subsequent discussion of the check scanning component 102, the check scanning component is also operable in accordance with aspects of the present invention to detect one or more security features in the original check and to include an indication or indications of the security feature(s) in the image data file that represents the image of the original check.

The check truncation system 100 also includes a communication channel 104 by which check image data files generated by check scanning component 102 are transmitted through banking channels for further processing. The further processing may include conventional processes for electronic check presentment, payment and clearing.

Further, the check truncation system 100 includes a substitute check printing component 106. The printing component 106 may be operative to receive the check image files from the communication channel 104 and to print substitute checks based on the image files. The printing component may operate generally in accordance with conventional printing techniques (e.g., ink jet printing), except that the printing component may print with two different black inks, and may select the particular one of the two inks to be used for a particular pixel of the substitute check on the basis of contents of the image file. As will be appreciated from previous discussion, at least one of the two inks may contain a special characteristic such as fluorescence so that the printed substitute check, while true in outward appearance to the original check, contains a hidden indication or indications of a security feature or features that were present in the original check. If both inks have special characteristics, the special characteristics of the two inks may be indistinguishable in ordinary viewing conditions. (In some embodiments, the printing component 106 may be omitted, and/or substitute checks may not be printed.) Where a check image is printed with two different inks (with the difference between the inks being detectable in some manner, even though the inks may appear the same under some circumstances), the image may be referred to as a "bichrome image" even if both inks may appear black under some circumstances.

In addition, the check truncation system 100 includes equipment 108 for physically handling/transporting the substitute checks produced by the printing component 106, to allow for further processing of the substitute checks. Still further, the check truncation system 100 includes a substitute check scanning component 110, which is described in further detail below. The substitute check scanning component 110 may scan a substitute check transported to or past the substitute check scanning component 110 by the check handling/transporting equipment 108, for (possibly among other purposes) detecting indications in special ink on the substitute check.

Figure 2:
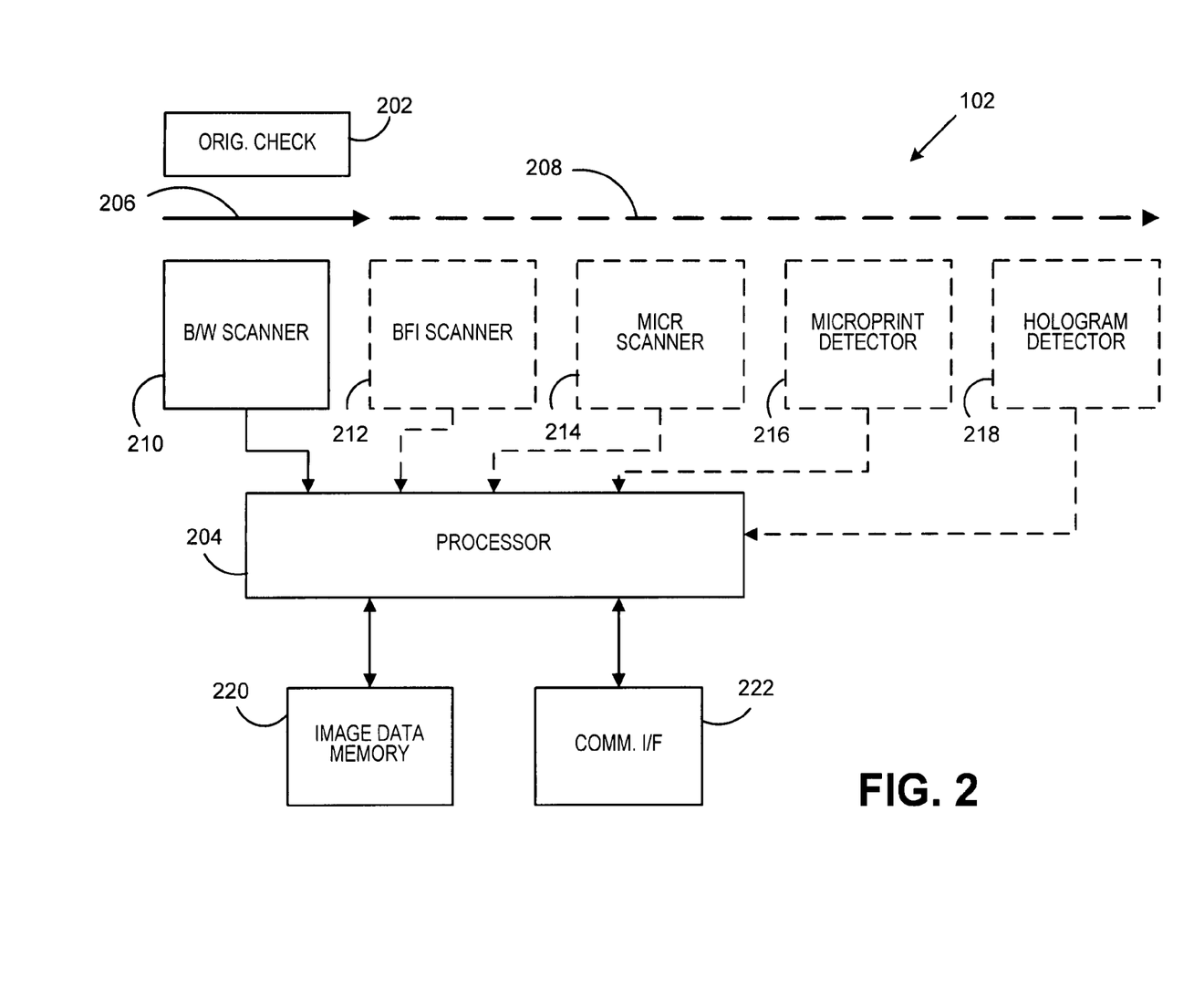
FIG. 2 is a schematic block diagram of a check scanning component of the system of FIG. 1.

FIG. 2 is a schematic block diagram of the original check scanning component 102 of the check truncation system 100. An original check to be scanned by the scanning component 102 is indicated by reference numeral 202. The original check 202 may include one or more conventional security features, which are not separately shown, such as microprinting, one or more holograms, and magnetic ink (MICR) printing. Moreover, the original check 202 may include one or more other security features (also not separately shown), not yet commonly in use, such as BFI printing (e.g., in the form of a four-state barcode or two-dimensional barcode completely printed with BFI or partially printed with BFI and partially printed with non-fluorescent ink). Also, the original check may contain conventional check features (not separately shown) such as the name of the drawee bank, the date of the check, the payee's name, the courtesy dollar amount, the dollar amount spelled out in words, the date of the check, the drawer's signature, a check number, a routing number, etc.

The check scanning component 102 includes a processor 204 which may control general operation of the check scanning component 102. The check scanning component 102 may also include other constituent parts which are not explicitly shown in FIG. 2, including for example program memory for storing software/firmware that controls the processor 204 and a housing to contain some or all of the other constituent parts of the check scanning component 102.

The check scanning component 102 may also include a check transport mechanism (schematically indicated by arrow 206 and dashed arrow 208) to transport the original check 202 past scanning/detection modules to be described below. Further, the check scanning component 102 includes a module 210 which captures a black and white image of the original check 202 and provides corresponding image data to the processor 204. The black and white scanning module 210 may operate in accordance with conventional practices for a Check21 check scanner. In addition, the check scanning component 102 may include one or more of modules 212, 214, 216 and 218 (shown in phantom) for detecting respective security features of the original check 202. Each of the modules 212, 214, 216, 218 (and also the black and white scanning module 210) is coupled to the processor 204 to provide input to the processor 204.

Module 212—if present—is operative to detect the presence (and possibly also the configuration) of features printed on the original check with BFI. The BFI scanning module may include a suitable radiation source (not separately shown) to excite into fluorescence BFI present on the original check 202.

Module 214—if present—is operative to detect magnetic ink printing (e.g., MICR characters) on the original check 202.

Module 216—if present—is operative to detect microprinting on the original check 202.

Module 218—if present—is operative to detect one or more holograms present on the original check 202.

One or more other types of module (not shown), to provide machine detection of other types of security features on the original check 202, may also or alternatively be present. For example, one such other module may operate to detect infrared absorbing ink on the original check 202 and may include an infrared radiation source (also not shown) to illuminate the original check with infrared radiation.

The check scanning component 102 may also include a memory 220 coupled to the processor 204. The memory 220 may store image data generated by the black and white scanner 210. As will be seen, the image data stored in the memory 220 may be modified by the processor 204 to reflect input(s) received from one or more of the modules 212, 214, 216, 218.

In addition, the check scanning component 102 may include a communication interface 222 coupled to the processor 204. The communication interface 222 allows the check scanning component 102 to exchange data communications with other components of the system 100, such as the communication channel 104. For example, the check scanning component 102 may forward check image data files downstream in the system 100 via the communication channel 104 by using the communication interface 222.

Figure 3:
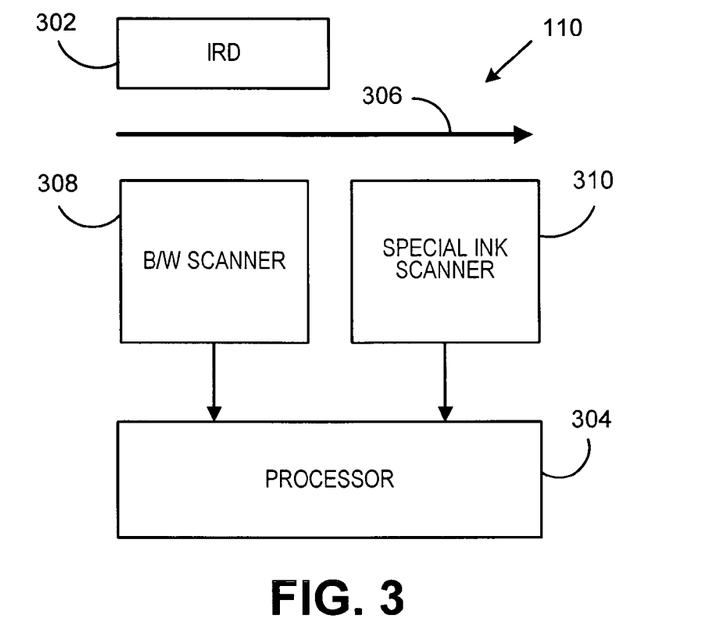
FIG. 3 is a schematic block diagram representation of a component for scanning a substitute check in the system of FIG. 1.

FIG. 3 is a schematic block diagram representation of substitute check scanning component 110 of the check truncation system 100. Reference numeral 302 indicates a printed substitute check that was printed by the substitute check printing component 106 (FIG. 1) of the check truncation system 100 based on a check image data file generated by the check scanning component 102 and forwarded to the substitute check printing component 106 via the communication channel 104. The printed substitute check 302 may also be referred to as an "image replacement document" or "IRD".

The substitute check scanning component 110 includes a processor 304 which may control general operation of the substitute check scanning component 110. The substitute check scanning component 110 may also include other constituent parts which are not explicitly shown in FIG. 3, including for example program memory for storing software/firmware that controls the processor 304 and a housing to contain some or all of the other constituent parts of the substitute check scanning component 110. Working memory and/or image data storage memory (both not shown) may also be present in the substitute check scanning component 110, and may be coupled to the processor 304. One or more input/output devices and/or communication interfaces, coupled to the processor 304, may also be included in the substitute check scanning component 110 but also are not shown in the drawing.

The substitute check scanning component 110 may also include a check transport mechanism (schematically indicated by arrow 306) to transport the substitute check 302 past scanning modules to be described below.

In addition, the substitute check scanning component 110 may include a module 308 which is coupled to the processor 304. The module 308 may be operative to scan the substitute check 302 and to generate data that represents a black and white image of the substitute check 302. The image data may be provided to the processor 304 by the black and white scanning module 308.

Still further, the substitute check scanning component 110 includes a module 310 which is also coupled to the processor 304. The module 310 is operative to scan the substitute check 302 and to detect one or more features or portions of the substitute check on which a special ink is printed. As described in more detail below, the special ink scanning module 310 may allow the substitute check scanning component 110 to detect that the substitute check 302 contains one or more indications of one or more security features that were present in the original check represented by the substitute check 302. The special ink scanning module 310 may, for example, be operative to detect BFI printed on the substitute check 302. In such a case, the special ink scanning module may include a suitable light or radiation source for stimulating the BFI into fluorescence. In other embodiments, the special ink scanning module 310 may be operative to detect magnetic ink, infrared absorbing ink or black ink that is metameric relative to another (e.g., conventional) black ink. In some embodiments, the substitute check scanning component 110 may include more than one special ink scanning module to allow the substitute check scanning component 110 to detect more than one type of special ink on the substitute check 302.

Figure 4:
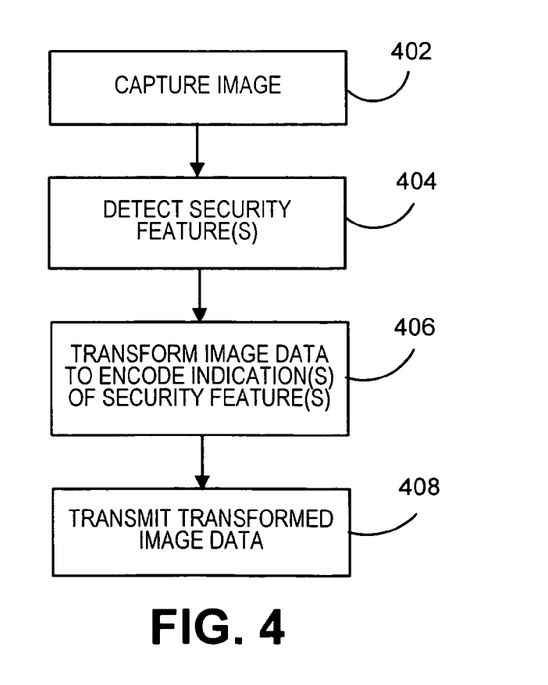
FIG. 4 is a flow chart that illustrates a process performed by the check scanning component illustrated in FIG. 2.

FIG. 4 is a flow chart that illustrates a process performed by the check scanning component 102 of the check truncation system 100. At 402 in FIG. 4, the check scanning component 102 captures a black and white image of the original check 202 (FIG. 2) and stores a corresponding image data file. This may be done in an essentially conventional manner by the black and white scanning module 210, with the image data file stored in the image data memory 220. The data may be stored in a form such that there is a respective image data pixel in the image data file for each pixel of the captured image. Each "white" data pixel may have a pixel value of "0" for example, and each "black" data pixel may have a pixel value of "255" for example.

At 404 in FIG. 4, the check scanning component 102 may detect one or more security features in the original check 202. The security feature(s) detected may be any security feature currently or hereafter included in printed check stock. For example, the security feature(s) may include any one or more of microprinting, magnetic printing, one or more holograms, and BFI printing (e.g., in one or more barcodes). The detection of the security features may be effected by one or more of the modules 212, 214, 216, 218 shown in FIG. 2 and discussed above and/or by another or other security feature detection module(s) that may be present. An input signal or signals to indicate detection of the security features may be provided by the security feature detection module(s) to the processor 204 (FIG. 2).

At 406, the processor responds to the input signal(s) from the security feature detection module(s) by effecting a transformation of the image data file to provide an encoded indication or indications in the file of the fact that one or more security features were present in the original check. This indication may be in the form of side data or, more preferably, may take the form of modification of the values of one or more of the image data pixels. For example, the "black" data pixels for certain portions of the check image may be converted to another value to indicate the presence of the security features in the original check. The other value may be, for example, "128" or any other value between "0" and "255". As will be seen, the other value for a given pixel may cause the downstream substitute check printer 106 to print the corresponding pixels in the substitute check with a special black ink rather than an ordinary black ink used to print the other black pixels (i.e., the pixels corresponding to the "255" data pixels).

At 408, the processor 204 may use the communication interface 222 to transmit the converted check image data file through the check image data communication channel 104 (FIG. 1). Thereafter, the check image data file may be received at a downstream point in the banking channels and may be used to drive the substitute check printer 106 to print a paper substitute check (IRD) 302 to represent the original check 202 scanned at steps 402, 404 in FIG. 4. As suggested by previous discussion, the substitute check printer 106 may print black pixels having the ordinary value for black pixels with an ordinary black ink, and may print black pixels having the converted pixel value with a special black ink that has a characteristic that is not present in the ordinary black ink. Thus the printer 106 may select between an ordinary black ink and a special black ink (e.g., BFI) based on the values of the respective image data pixels. The pattern of the special black ink printing on the substitute check may be an indication or indications of the security feature(s) of the original check represented by the substitute check. The characteristic of the special black ink not present in the ordinary black ink may be fluorescence, infrared absorption, metamerism or magnetism, or some other characteristic, and may be such as to be detectable by the special ink scanner 310 discussed hereinabove in connection with FIG. 3.

Figure 5:
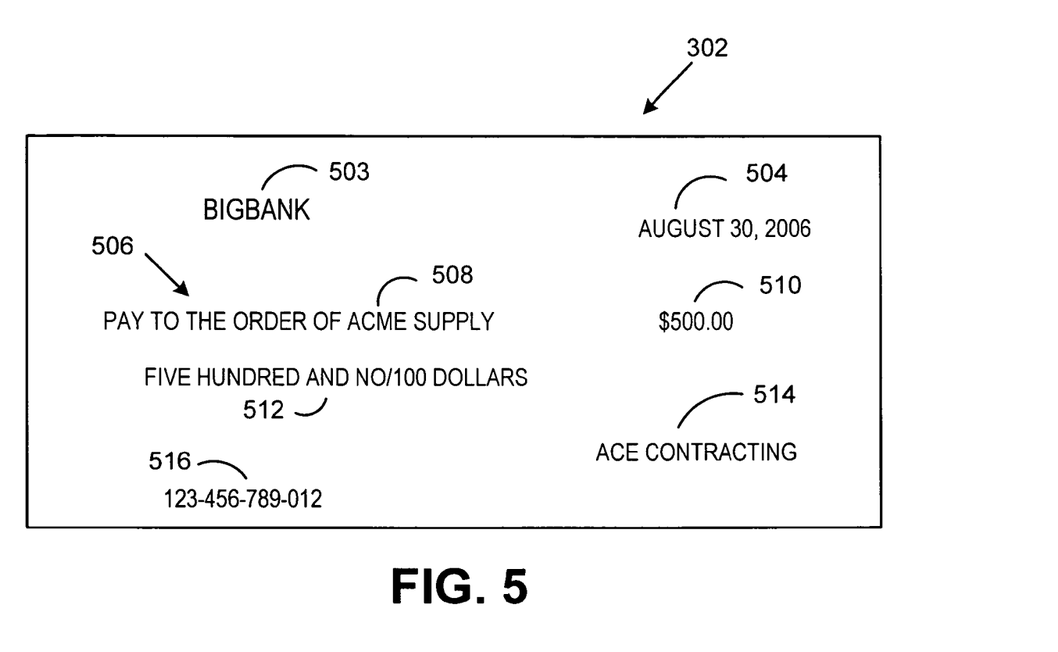
FIG. 5 is a simplified illustration of a substitute check that may be produced in the system of FIG. 1.

FIG. 5 is a simplified illustration of the substitute check 302 printed by the substitute check printer 106. The appearance of the substitute check may be essentially true to the appearance of the original check and thus may not have any visible features that are not conventional. For example, as shown in FIG. 5, the substitute check 302 may include the name 502 of the drawee bank, the date 504 of the original check, the payment instructions 506, including the name 508 of the payee, the courtesy dollar amount 510, the dollar amount expressed in words 512, the drawer's signature 514 and a routing code 516. In addition, other printing may be present, although not shown in FIG. 5. The hidden indications in the substitute check 302 are not separately illustrated in FIG. 5 but, as provided according to one example embodiment, will be described below in connection with operation of the substitute check scanner 110.

Figure 6:
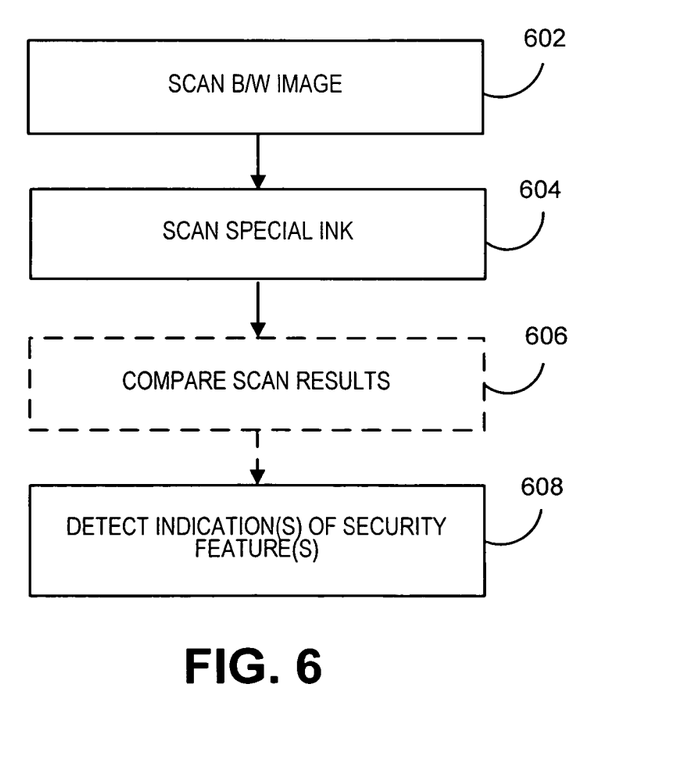
FIG. 6 is a flow chart that illustrates a process performed by the substitute check scanning component illustrated in FIG. 3.

FIG. 6 is a flow chart that illustrates a process performed by the substitute check scanning component (substitute check scanner) 110 of the check truncation system 100.

Figure 7:
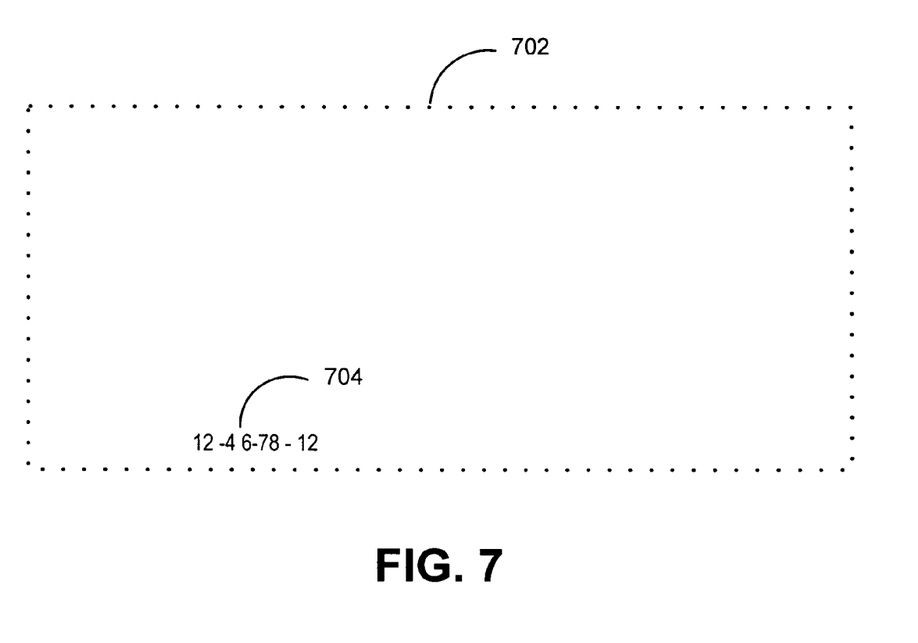
FIG. 7 is an illustration of an image that may be produced by the substitute check scanning component when it scans the substitute check of FIG. 5 for a special ink.

At 602, the substitute check scanner 110 uses the black and white scanning module 308 to capture a black and white image of the substitute check 302. This may be done in a conventional manner. At 604, the special ink scanning module 310 also scans the substitute check 302 to detect features on the substitute check that were printed with a special ink such as BFI. In some embodiments, as indicated at 606, the substitute check scanner 110 may compare the respective images of the substitute check as generated by the scanning modules 308, 310. The image generated by the black and white scanning module 308 may be as illustrated in FIG. 5. The image generated by the special ink scanning module 310 may be as illustrated in FIG. 7. In FIG. 7, the dotted outline 702 is indicative of the perimeter of the substitute check 302. Reference numeral 704 generally indicates portions of the routing code (indicated by reference numeral 516 in FIG. 5) that were printed in (say) BFI rather than ordinary black ink, and hence were detected by the scan performed at step 604 by special ink scanning module 310. In the particular example illustrated in FIGS. 5 and 7, the first, second, fourth, sixth, seventh, eighth, eleventh and twelfth digits of the routing code were printed by the substitute check printer 106 with (say) BFI, whereas the third, fifth, ninth and tenth digits of the routing code were printed by the substitute check printer 106 with ordinary black ink (i.e., non-fluorescent black ink). It is also assumed for this example that the three dashes in the routing code were printed with BFI. The particular selection of routing code digits printed in BFI rather than ordinary black ink reflects transformations of the original check image data performed by the processor 204 of the original check scanner 102 to encode indication(s) of one or more security features of the original check 202. In other words, by transforming certain data in the original data file, the processor 204 effectively selected certain digits of the routing code to be printed with special black ink rather than ordinary black ink so that the substitute check would contain coded indications of the security feature(s) of the original check. The substitute check printer 106 responded to the selections made by the processor 204 of the original check scanner 102 by printing the selected routing code digits with special black ink rather than ordinary black ink, and then the selected digits are detected by the substitute check scanner 110, as indicated by step 608 in FIG. 6, possibly by comparison of the images shown in FIGS. 5 and 7, as indicated by step 606 in FIG. 6. Alternatively, the black and white scan at step 602 may be omitted (and the scanning module 308 may be omitted from the substitute check scanner 110). In such embodiments, the processor 304 of the substitute check scanner 304 may use the dashes (assumed for some embodiments always to be printed with special ink) in the routing code to find the locations of the routing code digits, and thereby to determine which digits are printed with BFI to represent security features, and which are not printed with BFI and thus (presumably) are printed with ordinary ink. By detecting which, if any routing code digits are printed with special ink, the processor 304 may, based on a predetermined coding system, determine which security features were present in the original check.

In alternative embodiments, the processor 204 of the original check scanner 102 may select other portions of the black and white check image for printing with special ink in addition to or instead of portions of the routing code, to indicate presence or absence of security features in the original check. However, using the routing code for this purpose may be preferable, since the format of the routing code may be fixed, thereby aiding the substitute check scanner 110 in reading the coded indication created by the processor 204 of the original check scanner 102.

Figure 8A:
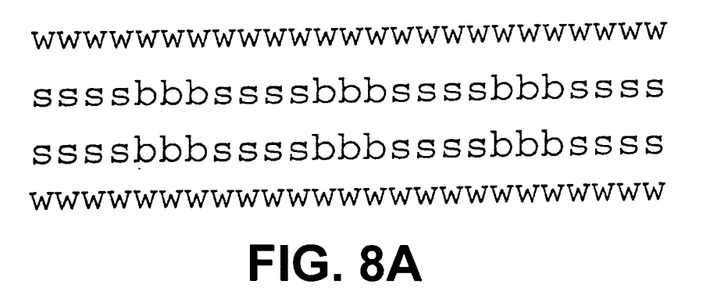
FIGS. 8A-8C are schematic illustrations of respective examples in which a special ink is used in combination with an ordinary ink to provide an encoded indication in a substitute check of a security feature that was present in the corresponding check.
Figure 8B:
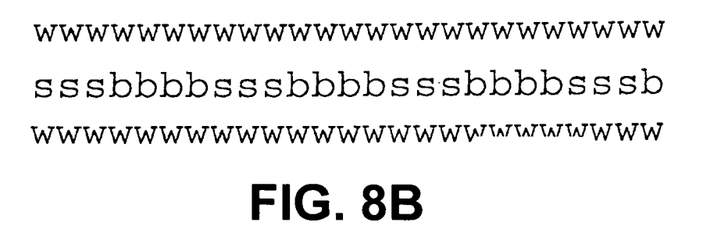
Figure 8C:
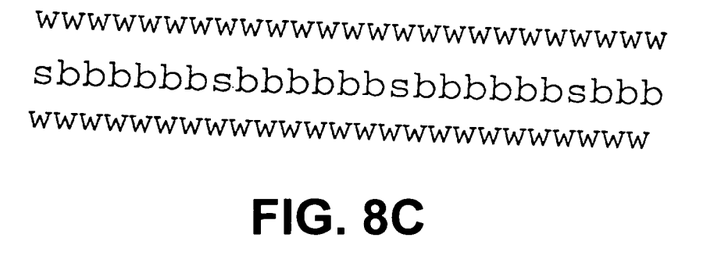

FIGS. 8A-8C are schematic illustrations of respective examples of another manner in which a special ink may be used in combination with an ordinary ink to provide an encoded indication in a substitute check of a security feature that was present in the corresponding check.

In the examples shown, each letter "w" represents a white (not printed) pixel, each letter "s" represents a pixel printed with special ink, and each letter "b" represents a pixel printed with ordinary black ink. In each of these examples, m of each n sequential pixels in a row are printed with special ink, m and n both being integers.

In the example shown in FIG. 8A, a two-pixel-high line is schematically shown, with m=4 and n=7. A line encoded in this manner may represent an indication that magnetic ink was present in the original check.

In the example shown in FIG. 8B, a one-pixel-high line is schematically shown, with m=3 and n=7. A line encoded in this manner may represent an indication that BFI ink was present in the original check.

In the example shown in FIG. 8C, a one-pixel-high line is schematically shown with m=1 and n=7. A line encoded in this manner may represent an indication that there was microprinting in the original check.

In other examples either or both of the values of m and n may be different from those indicated above. The height of the encoded line may be greater than one or two pixels.

For purposes of this disclosure and the appended claims, an ink may be considered "black", regardless of its color and/or absorption spectrum, so long as it results in a black pixel when scanned with a black and white scanning module 308.

The flow charts and descriptions thereof included herein should not be construed as prescribing a fixed order of performing the process steps stated therein. Rather the process steps may be performed in any order that is practicable.

Other data encoding schemes may be employed as alternatives to selecting portions of the check image to be printed with special ink. For example, one or more indications of security feature(s) in the original check may be embedded in the image of the original check by a technique disclosed in the co-pending and commonly-assigned patent application which was published as U.S. published patent application no. 20060139381.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method comprising:
   scanning a check to generate image data representative of an image of said check;
   detecting at least one security feature of said check; and
   transforming the image data to include at least one encoded indication of said detected at least one security feature of said check.

2. The method according to claim 1, further comprising:
   using said transformed image data to generate a printed replacement for said check, said printed replacement including coded information that represents said detected at least one security feature.

3. The method according to claim 2, wherein said using step includes using two different inks to print said printed replacement.

4. The method according to claim 3, wherein said coded information is represented by selecting some portions of said image for printing with one of said inks and selecting other portions of said image for printing with another one of said inks.

5. The method according to claim 4, wherein said two different inks include a black fluorescent ink and a black ink that is not fluorescent.

6. The method according to claim 4, wherein said two different inks include a magnetic ink and a nonmagnetic ink.

7. The method according to claim 6, wherein both of said inks are black.

8. The method according to claim 4, wherein said two different inks are metameric relative to each other.

9. The method according to claim 8, wherein said two different inks are both black.

10. The method according to claim 1, wherein said at least one security feature includes at least one feature selected from the group consisting of: (a) a hologram; (b) an optically variable ink; (c) a magnetic ink; and (d) microprinting.

\* \* \* \* \*